(12) United States Patent
Hochart et al.

(10) Patent No.: US 8,151,310 B2
(45) Date of Patent: Apr. 3, 2012

(54) VIDEO DELIVERY OF OILFIELD DATA

(75) Inventors: Pascal Hochart, Beijing (CN); Zhuyun Dai, Beijing (CN); Yao Liu, Beijing (CN); Min He, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 1151 days.

(21) Appl. No.: 11/580,564

(22) Filed: Oct. 13, 2006

(65) Prior Publication Data

US 2008/0092190 A1    Apr. 17, 2008

(51) Int. Cl.
- *H04N 7/173* (2006.01)
- *H04N 7/16* (2006.01)
- *G06G 7/58* (2006.01)
- *G06F 3/00* (2006.01)

(52) U.S. Cl. ........ 725/105; 725/114; 725/138; 725/144; 703/10; 715/700; 715/719; 715/720; 715/724

(58) Field of Classification Search .................. 725/105, 725/114, 138, 144; 703/10; 715/700, 719–724
See application file for complete search history.

(56) References Cited

U.S. PATENT DOCUMENTS

| | | | |
|---|---|---|---|
| 6,233,017 B1 * | 5/2001 | Chaddha | 375/240.12 |
| 6,369,835 B1 * | 4/2002 | Lin | 715/726 |
| 2002/0106191 A1 * | 8/2002 | Betz et al. | 386/70 |
| 2003/0101156 A1 * | 5/2003 | Newman | 707/1 |
| 2005/0100319 A1 * | 5/2005 | Saed | 386/69 |
| 2005/0220188 A1 * | 10/2005 | Wang | 375/240.03 |
| 2007/0216761 A1 * | 9/2007 | Gronner et al. | 348/14.02 |

* cited by examiner

*Primary Examiner* — Kristine Kincaid
*Assistant Examiner* — Gigi L Dubasky
(74) *Attorney, Agent, or Firm* — Jianguang Du; Hoffman Warnick LLC

(57) ABSTRACT

A data delivering system comprises a video server receiving and processing oilfield data into a video delivery, and a network delivering the video delivery from the video server to at least one client device, where the video delivery including a plurality of sections.

19 Claims, 13 Drawing Sheets

VIDEO DELIVERY OF OILFIELD DATA

FIELD OF THE INVENTION

The present invention relates generally to data processing. More particularly, the present invention relates to a method and system for video delivery of oilfield data from a video server to client.

BACKGROUND OF THE INVENTION

FIG. 1 schematically shows a diagram of traditional oilfield data transmission from oilfield site to the user. Scenario 1 shows physical delivery in which the oilfield data is directly delivered via a physical media to users. The physical media can be CD, DVD, hard-disk, memory stick or flash card, etc. All the digital data including raw measurement, graphic files and additional format support information are packaged together and recorded on a media and physically delivered to the users. The users will then load the media on its computer to access the digital data. However, scenario 1 does not provide real time oilfield data transmission. In addition, the huge size of the data files could increase the cost on hard copy distribution, and generation of physical media takes extra time and money. Further, scenario 1 incurs cost of delivery, and introduces additional security and confidentiality risks.

Scenario 2 shows real time oilfield data transmission via internet. The oilfield data could be uploaded to internet, transmitted via internet, and downloaded by the users. However, if the network bandwidth is not broad enough, scenario 2 cannot allow transmitting large size packages. In addition, scenarios 1 and 2 require extra tools to visualize and analyze those data files, and most of those tools do not allow the users to either interact with the data or dynamically analyze the data.

Scenario 3 allows the user to transmit the data as a stream in real-time and further interpret the stream on the user's station in real-time. However, similar to scenario 2, if the network bandwidth is not broad enough, scenario 3 cannot allow transmitting large size packages.

In addition, there are three approaches today to view media (such as video, audio, animation, documents, etc.) over the internet, namely, downloading, streaming and a hybrid of both.

To view media via downloading, the user has to wait that the entire file is published, transmitted and saved on its computer before being played. Such approach does not satisfy requirement of real-time information access, especially for large files. Streaming can be achieved by embedding special HTML codes into the web page link to the file. Delivery files this way is known as HTTP delivery or HTTP streaming.

The streaming approach works differently and allows the user to access the information and watch it as soon as it begins to be transmitted (downloaded). The streaming approach allows the user a rapid access to the information and can fulfill real-time information delivery in the same way as web-cast or net-cast.

The progressive downloading is a hybrid of the previous 2 methods. The file is downloaded as described in the first method, and can be played as soon as the file is created on the target machine. The drawback is that no "live" real-time transmission can be achieved in this way.

In the field of oilfield data service, as the data are acquired versus time or depth at different index and different acquisition modes (e.g. different frequencies, azimuth, etc.), the user needs to be able to visualize information from these modes together or independently. In classical desktop application, multiple windows or presentation might be open at the same time focusing on different data received. However, this would not cope with several types of oilfield data transmission where information of different types are acquired in parallel but cannot be displayed together without overwhelming the user's display.

SUMMARY OF THE INVENTION

The current invention provides methods and systems for video delivery of oilfield data from a video server to client. The data delivering system comprises a video server receiving and processing oilfield data into a video delivery, and a network delivering the video delivery from the video server to at least one client device, where the video delivery including a plurality of sections. The method for oilfield data delivery comprises receiving and processing oilfield data into a video delivery, and delivering the video delivery to at least one client device via a network, where the video delivery including a plurality of sections.

Embodiments of the method may further include receiving a selection signal from the at least one client device and customizing contents of the plurality of sections in response to the selection signal. Embodiments of the method may further include receiving a request signal from the at least one client device, and transmitting requested ones of the plurality of sections to the at least one client device in response to the request signal.

The current invention further provides a video delivery generation apparatus for generating a video delivery from oilfield data. The video delivery generation apparatus comprises an image generator that decomposes the oilfield data into different groups based on different acquisition modes and generates a plurality of frames from the different groups of oilfield data; a frame composer that receives the frames from the image generator and composes the frames into continuous frames as a video section; and a video composer that receives a plurality of video sections from the frame composer and organizes the video sections into the video delivery in accordance with a video structure template.

The current invention further provides a method of creating a video delivery from oilfield data on the GUI in a computer system having a graphical user interface (GUI) and a selection device. The method comprises displaying a first area, second area, and third area on the GUI; retrieving a set of oilfield data; displaying various frames derived from the set of oilfield data on the first area; receiving input signals from the selection device operating on the second area; and displaying a plurality of generated video sections on the third area in response to the input signals, where the plurality of generated video sections forming the video delivery.

Additional objects and advantages of the invention will become apparent to those skilled in the art upon reference to the detailed description taken in conjunction with the provided figures.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION OF THE INVENTION

Figure 1:
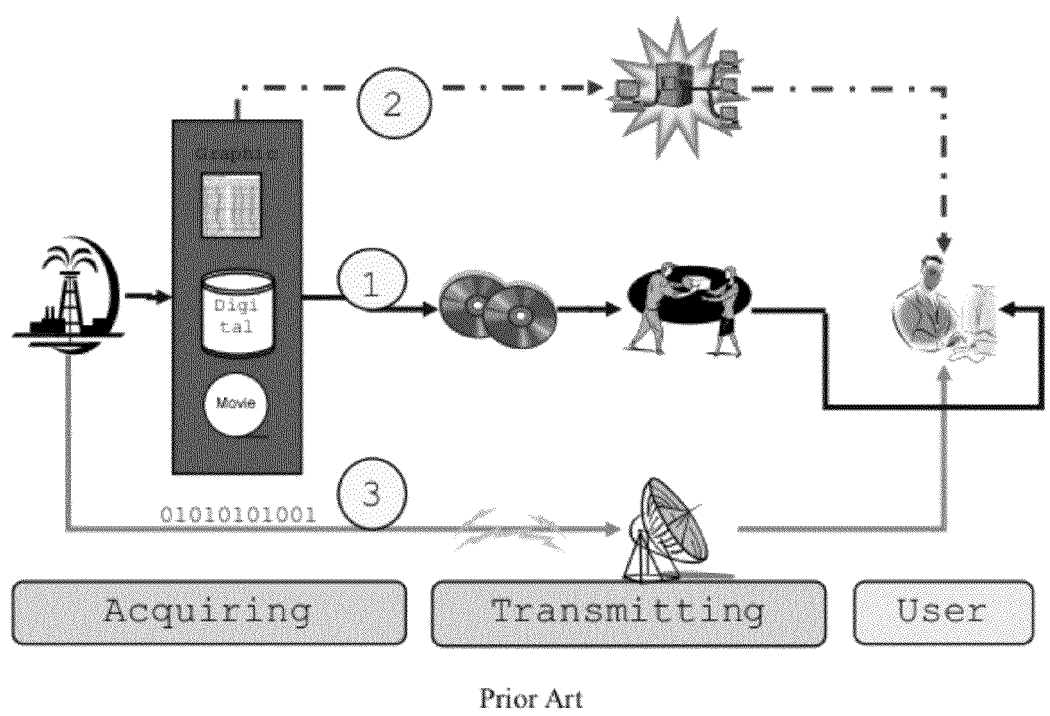
FIG. 1 schematically shows a diagram of traditional oilfield measurement data transmission paths.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In one embodiment of the invention, the term "oilfield data" is live data of oilfield measurements acquired from a rig site, which are different types of data acquired in parallel along with the aiguille device going into the earth versus time or depth at different index and at different acquisition modes (e.g. different frequencies, azimuths etc.). The oilfield data is for example various physical feature data, such as pressure, temperature, electrical resistance of the earth, etc., and the user needs to be able to visualize these various data together or independently on a Graphical User Interface, so as to analyze these data.

The term "index" in this specification indicates a measurement of the depth, time, or acquisition time where or when the aiguille device goes into the earth, which can be represented by a unit of foot, or second etc. respectively.

The term "sections" in this specification can also be referred to as "channels", which constitute a video delivery and each section corresponds to one or multiple modes. The user is able to navigate from one section to another. This corresponds to the capability of watching different channels on TV. The spectator can change channel, or encrust a channel in another one.

Hereinafter, the system and method according to exemplary embodiments of the invention will be described with reference to the drawings.

Figure 2:
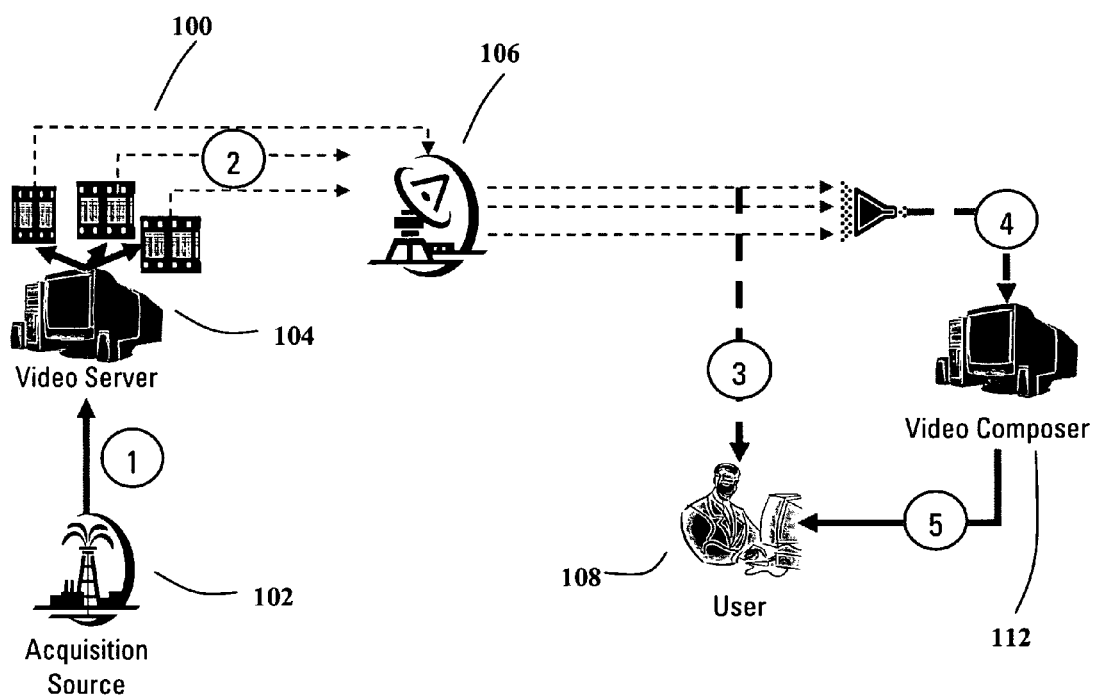
FIG. 2 illustrates a diagram of an oilfield data delivering system according to one embodiment of the invention.

FIG. 2 illustrates a diagram of an oilfield data delivering system according to an embodiment of the invention. Referring to FIG. 2, the oilfield data delivering system 100 according to the embodiment of the invention comprises: an acquisition source (oilfield data acquisition site) 102, a video server 104, a network 106, and a client device 108. In addition, the system 100 can further comprise a re-composer 112. Here, the video server 104 is either a general purpose computer which is loaded with a computer program that can realize the functions of the invention, or an application specific computer which is provided with a circuit unit that can realize the functions of the invention. In the invention, there may be a plurality of the video server 104, which is not limited to only one. The video server 104 will be described in detail later. The client device 108 is any type of computer, such as a desk-top computer, a lap-top computer, or a personal digital assistant, which can run various applications thereon. In the invention, there may be a plurality of the client device 108, which is not limited to only one. The network 106 may be, for example, the Internet, but also could be an intranet, a local area network, a wide area network, point-to-point links, or other networks, including a satellite network, a terrestrial network, etc. It is sufficient for the network 106 to support a single way communication in the oilfield data delivering system 100 according to the embodiment of the invention. However, the network 106 might further support two-way communications, i.e. the video server 104 can either send various data to the client device 108 over the network 106, or receive the data sent from the client device 108 thereon. In addition, the network 106 has various transmission rates, for example, it can transmit data of several tens of megabits per second as an ultrahigh-speed communication network, and has a transmission rate of 384 kilobits per second as a mobile communication network.

Now, the operation of the oilfield data delivering system 100 will be described with reference to FIG. 2. In one embodiment, the data delivering system 100 delivers a video delivery representing oilfield data to at least one client device 108, in which the video server 104 receives the oilfield data acquired from the oilfield data acquisition site 102, and processes the acquired oilfield data into the video delivery; and the network 106 delivers the video delivery from the video server 104 to the at least one client device 108. Here, the video delivery may contain a plurality of sections. Specifically, all oilfield data acquired at oilfield data acquisition site 102 is lively transmitted in real-time to the local video server 104. The video server 104 decomposes the received data and generates images based on the decomposed data, in which the images are taken as frames representing views of oilfield data acquired at different indices. Then, the video server 104 encodes and compresses the frames to generate several video sections which form a video delivery corresponding to different acquisition modes, such as different frequencies, azimuths, etc. (the detailed operation will be described later), and transmits the generated video delivery to the client device 108. The video delivery includes one or more video files (for example, an AVI file) or one or more video streams (for example, a RMVB movie).

In case that the video server 104 transmits the video file such as a AVI file to the client device 108, the client device 108 as a desktop application receives and decodes the video file, and plays it on its screen to visualize the decoded video to the user. In such case, the user can analyze those oilfield data in a video form.

In case that the video server 104 transmits the video streams instead of the video file over the network 106, each of the video streams is received by the client device 108 on which the user will select which stream to look at (like selecting a TV channel), and received by the re-composer 112 provided between the network 106 and the client device 108. Here, the re-composer 112 is to ensure a final "sequential" movie file is generated at the end.

In the transmission and reception of the video stream, some frames constituting the video stream may be received by the client device 108 and the re-composer 112 in different sequence from that of the original video stream. In such case, the re-composer 112 rearranges sequence of the video frames of the video delivery (video streams) as the original sequence in accordance with a predetermined rule (e.g. the video structure template which will be described later) or an instruction or identification code received from the video server 104. In such case, the re-composer 112 can generate a final movie stream based on the rearranged video frames.

In such manner, the client device 108 receives and decodes the video streams from the re-composer 112, and visualizes and presents the decoded video streams to the user.

In another embodiment, the client device 108 is integrated with a functional module, such as a recomposing module performing the same function as the re-composer 112, which rearranges sequence of the frames as original one and displays the rearranged frames on its screen. In such case, the re-composer 112 is not necessary any more. In addition, in another embodiment, the video server 104 can publish information about the generated video delivery (video files and/or the video streams) on the network 106, and the client device 108 can receive or access the information over the network 106. In such case, the user can make a request through the client device 108 to receive the video files and/or video streams.

The video server 104 may receive the request signal sent by the client device 108, and transmit the video files and/or video streams requested by the user to the client device 108 via the network 106. Also, the video server 104 may receive a request signal from the client device 108, and transmit any requested section(s) of the plurality of sections of the video delivery to the client device 108 in response to the request signal. In such connection, any section(s) of the plurality of sections may be displayed on a screen by designation of the user. Then, the client device 108 may process the received contents as described above. In addition, the video server 104 may receive a selection signal from the client device, and customize contents of the plurality of sections in response to the selection signal.

As for the network 106, the more video files or streams the user requests, the more bandwidth is requested. Therefore, based on the selection made by the user, real-time performance of the delivery might be affected. However, since the compression has been made when the video files and streams are generated in the video server 104, the amount of data which needs to be transmitted over network 106 is much reduced by about 80%, which makes the requirement for the bandwidth much improved.

Figure 3:
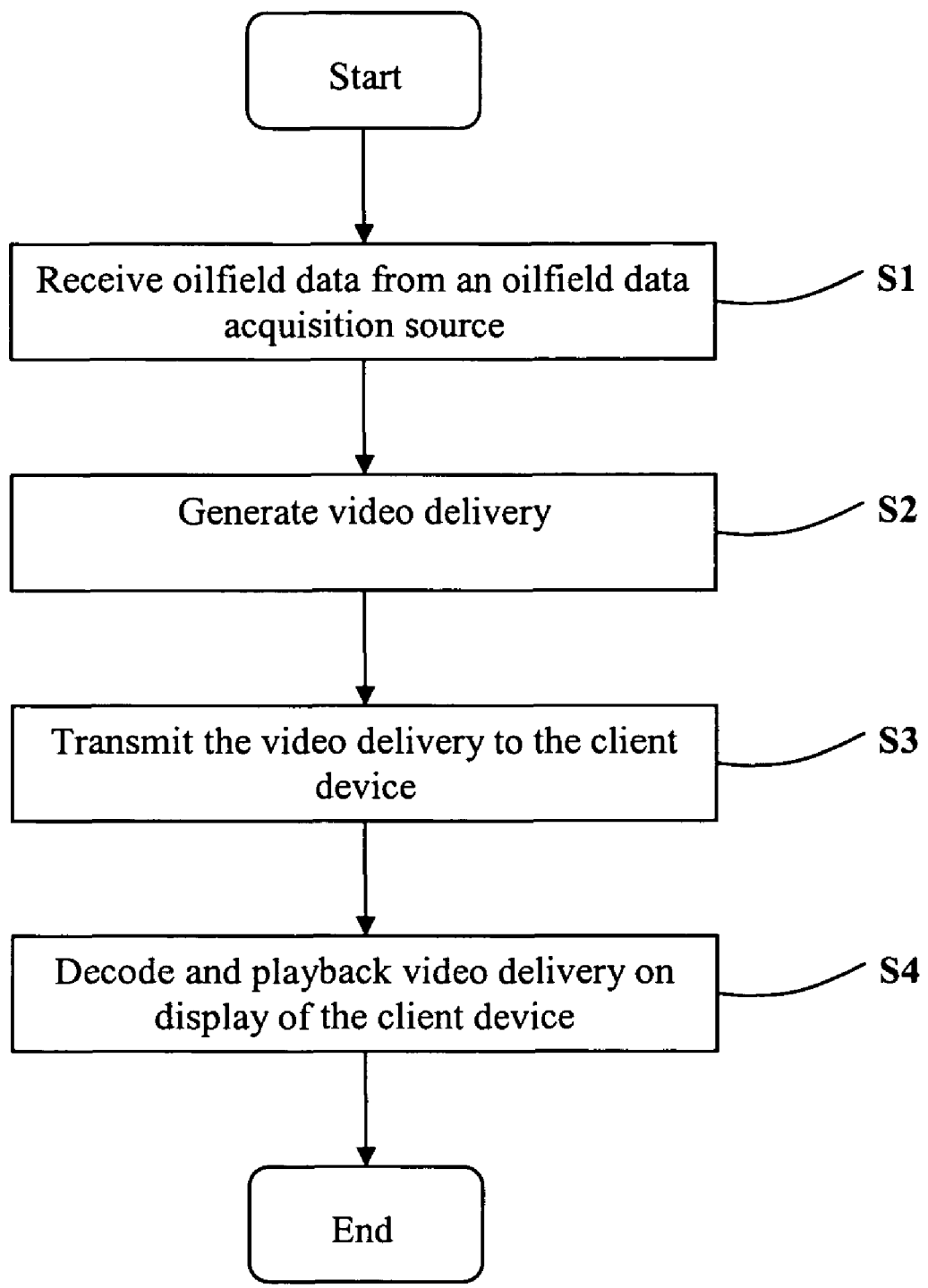
FIG. 3 illustrates a schematic flow chart of the operation of the oilfield data delivering system according to the embodiment of the invention.

FIG. 3 illustrates a flow chart showing the operation of the oilfield data delivering system 100. As shown in FIG. 3, in step S1, the local video server 104 receives in real-time all oilfield data acquired lively at oilfield data acquisition source 102. In step S2, the video server 104 decomposes the received data and generates images based on the decomposed data, takes the image as frames representing views of oilfield data acquired at different indices, encodes and compresses the frames to generate a video file (for example, a AVI file) or a video stream (for example, a RMVB movie) corresponding to different acquisition modes. Hereinafter, the video file and video stream can be referred as a video delivery in combination. In step S3, the video server 104 transmits the video delivery to the client device 108. In step S4, the client device 108 receives and decodes the video file, and plays it on its screen to visualize the decoded video to the user. In another embodiment, the client device 108 rearranges sequences of frames of the video stream by the re-composer 112 or its recomposing module (not shown), then visualizes and presents the video stream to the user.

Figure 4:
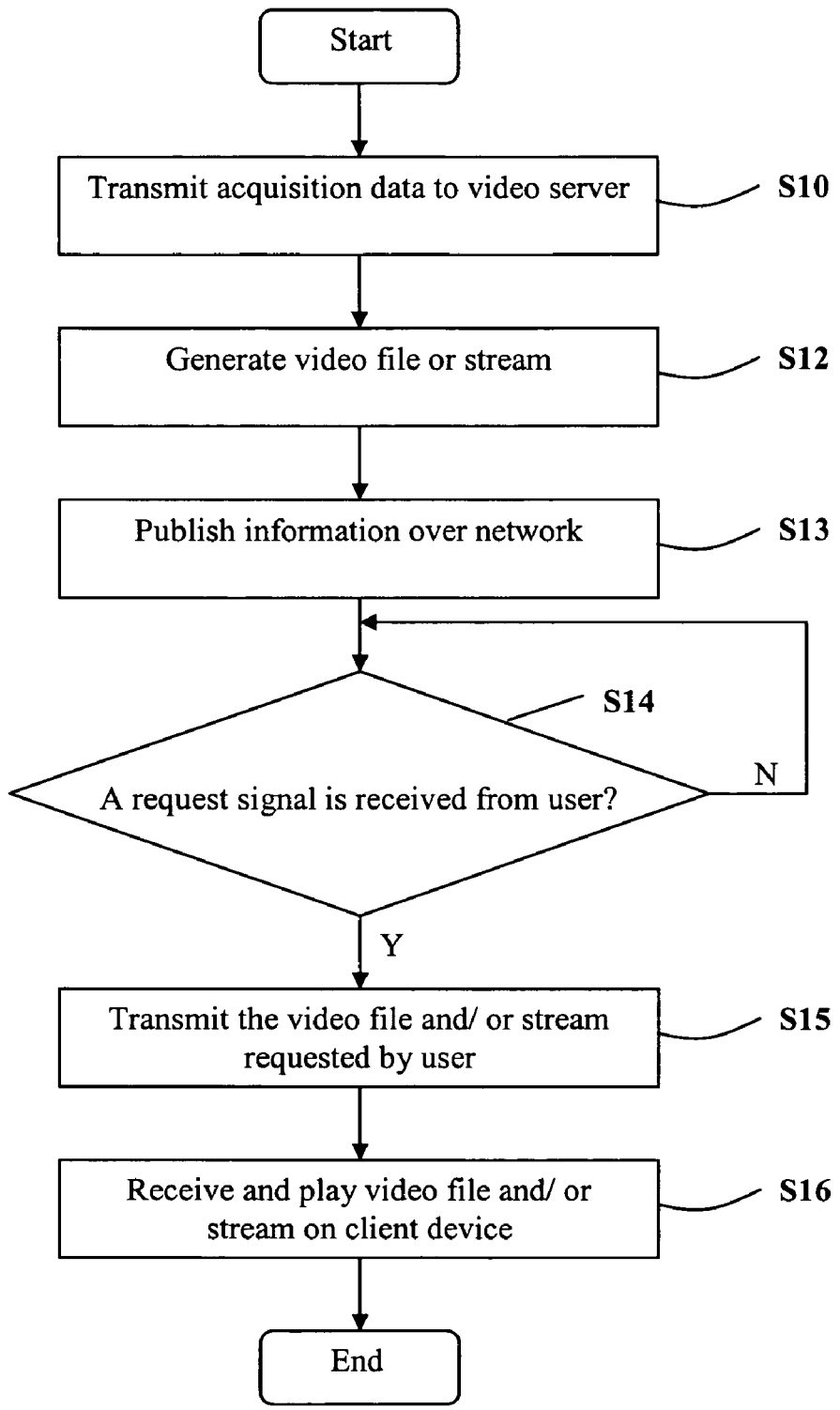
FIG. 4 illustrates a schematic flow chart showing the operation in user selection mode of the oilfield data delivering system according to another embodiment of the invention.

FIG. 4 illustrates a flow chart showing the operation in a user selection mode of the oilfield data delivering system 100. As shown in FIG. 4, in step S10, all oilfield data acquired at oilfield data acquisition source 102 is lively transmitted in real-time to the local video server 104. In step S12, the video server 104 decomposes the received data and generates images based on the decomposed data, takes the image as frames representing views of oilfield data acquired at different indices, encodes and compresses the frames to generate a video file (for example, a AVI file) or a video stream (for example, a RMVB movie) corresponding to different acquisition modes. In step S13, the video server 104 publishes information about the generated video files and/or the generated video streams over the network 106, so that the client device 108 can access the information and make a request for receiving the video files, and/or video streams. In step S14, the video server 104 decides whether or not a request signal is received from the client device 108. If the decision result in step S14 is "YES", the flow goes into step S15. In step S15, the video server 104 transmits the video file and/or video stream requested by the user to the client device 108. Then, the flow goes into step S16. In step S16, the client device 108 receives and decodes the video file and/or video stream, and visualizes and presents the decoded video stream to the user. If the result of decision in step S14 is "NO", the flow stops doing action and keeps waiting.

Figure 5:
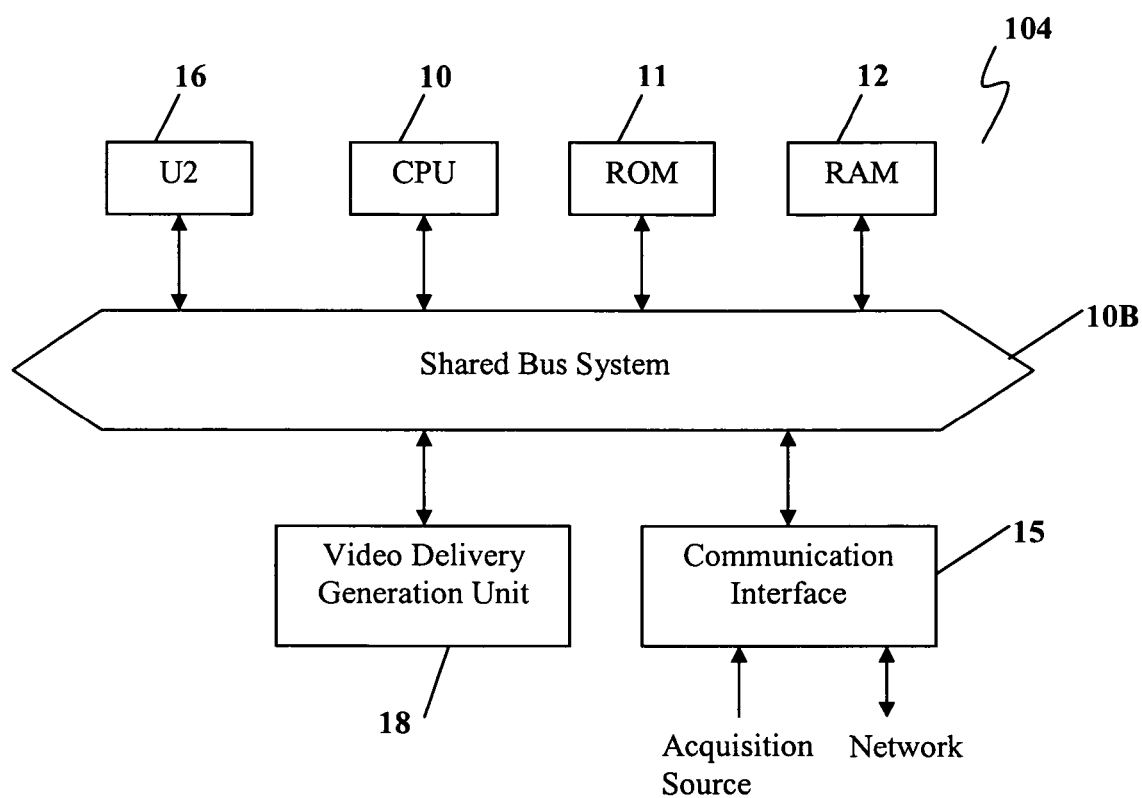
FIG. 5 illustrates a block diagram of the video server according to the embodiment of the invention.

Next, the video server 104 shown in FIG. 2 will be described in greater detail with reference to FIGS. 5. FIG. 5 illustrates a block diagram of the video server 104. As shown in FIG. 5, the video server 104 includes a central processing unit 10, which is abbreviated as CPU 10, a read only memory 11, which is abbreviated as ROM 11, a random access memory 12, which is abbreviated as RAM 12, a communication interface 15, a user interface (UI) 16, a video delivery generation unit 18, and a shared bus system 10B. The central processing unit 10 and other system components 11, 12, 15, 16, 18 are connected to the shared bus system 10B, and address codes, control codes, instruction codes, and data codes are transferred between the central processing unit 10 and other system components 11, 12, 15, 16, 18 through the shared bus system 10B.

In one embodiment, the video server 104 typically includes at least some form of computer readable media. Computer readable media can be any available media that can be accessed by the video server 104 and the client device 108. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the video server 106 and the client device 108. Computer storage media can be operatively coupled to the shared bus system 10B. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Communication media can be operatively coupled to the network 106. Combinations of the any of the above should be included within the scope of computer readable media. In the embodiment of the invention, the video delivery generated in the video server 106 can be stored on and/or distributed (transmitted) over the computer readable media.

The communication interface 15 is used for transmitting and/or receiving various codes, such as identification codes, address codes, control codes, instruction codes, and data codes, to/from the client device 108 via the network 106. In one embodiment, the communication interface 15 is used for receiving oilfield data from the oilfield data acquisition source 102 and the request for the video delivery from the client device 108, and transmitting the video delivery to client device 108 in response to the request. The video delivery generation unit 18 is used for generating video deliveries from the oilfield data, which will be delivered to the client device 108. The central processing unit 10 is the origin of the data processing capability, and accomplishes various tasks through execution of programmed instruction codes. The instructions codes form a computer program, and are stored in the read only memory 11 together with the identification code and other data codes. The random access memory 12 offers a working area to the central processing unit 10, and temporarily stores data codes, control codes and so forth.

The user interface 16 includes an input unit (not shown), such as a keyboard, mouse, touch panel screen, etc, which can receive control codes, instruction codes, and various data codes from the user and send these codes to the other components. The user interface 16 further includes an output unit (not shown), such as a display for presenting pictures and/or video to the user, and a loudspeaker for outputting audio effects to the user. The display is one of LCD (liquid crystal display), CRT (Cathode Ray Tube), or other kinds of display devices. In addition, the video server 104 may include an encoder and/or decoder (not shown), which performs encoding and/or decoding operations on the specific data. The encoder and/or decoder (not shown) can also be integrated into the video delivery generation unit 18, or can be realized by running software in the CPU 10 to perform the encoding and/or decoding functions on the specific data. In general, the encoder and/or decoder are the common ones used by those skilled in the art, so it will not be described in this specification for the purpose of simplification.

Figure 6:
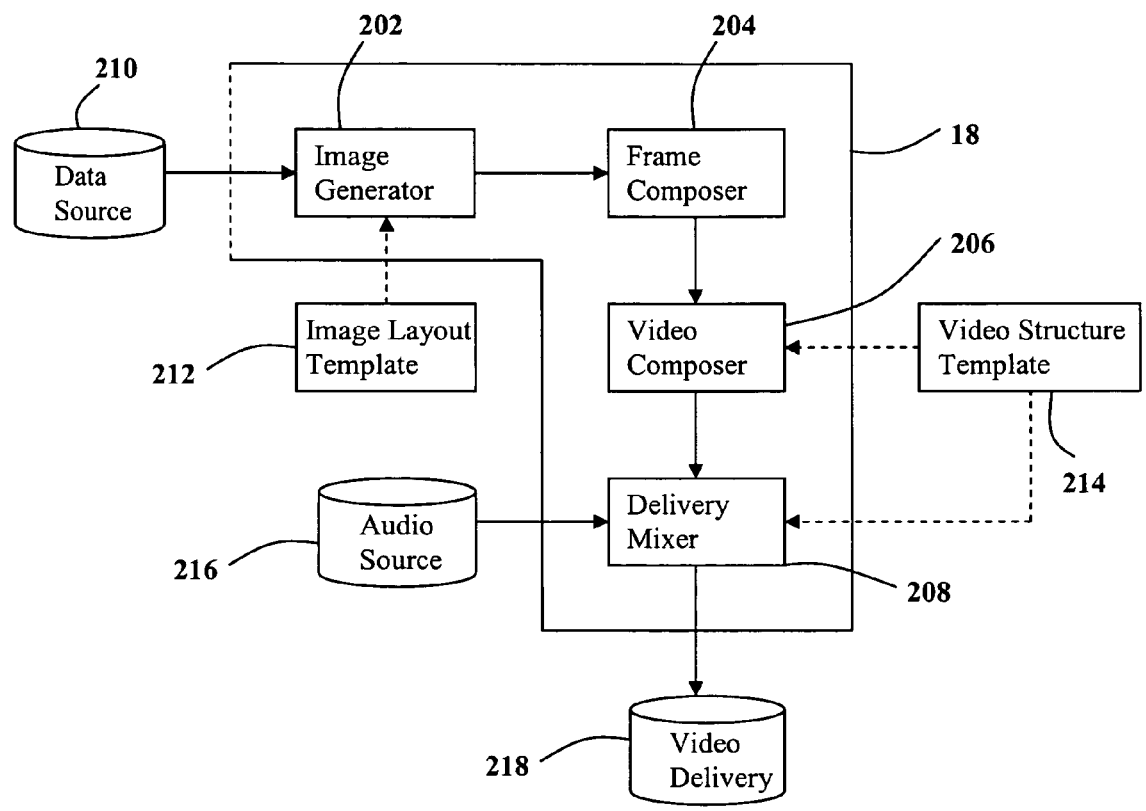
FIG. 6 illustrates a block diagram of the video delivery generation unit according to the embodiment of the invention.

FIG. 6 illustrates a block diagram of the video delivery generation unit 18. As shown in FIG. 6, the video delivery generation unit 18 includes an image generator 202, a frame composer 204, a video composer 206, and a delivery mixer 208. Further, the video delivery generation unit 18 includes a data source 210, an image layout template 212, a video structure template 214, an audio source 216, and a video delivery base 218. Specifically, the data source 210 is used for temporarily storing oilfield data lively acquired at the oilfield data acquisition site 102. The image layout template 212 is used for deciding contents and layout of the images generated from the oilfield data. The video structure template 214 is used for deciding how to organize video sections into the video delivery. The audio source 216 is used for storing audio file which will be added into the delivery. The video delivery base 218 is used for storing created video deliveries.

The image generator 202 retrieves oilfield data from a data source 210, or receives in real time oilfield data lively acquired from the oilfield data acquisition source 102, and generates separated images based on the internal organization of the oilfield data in accordance with an image layout template 212, which decides the contents and layout of the images. Here, the oilfield data may be real-time data acquired lively from the acquisition source 102, and may be data temporarily stored linearly with time or distance indices in the data source 210. Specifically, the image generator 202 decomposes the received data acquired at each index of depth, such as pressure data, temperature data, electrical resistance data, etc. respectively into different groups according to different acquisition modes, for example, different frequencies, azimuth etc.

For example, there are some oilfield data acquired at the index of 400 feet, which are pressure data a', b' and c', temperature data a", b", and c". In the above oilfield data, it is assumed that the pressure data a' and b' and the temperature data a" and b" are acquired at a frequency of 1000 Hz and at a azimuth of 30°, and the pressure data c' and the temperature data c" are acquired at a frequency of 11000 Hz and at a azimuth of 40°, then the above oilfield data is decomposed into four groups, in which the first group includes the pressure data a' and b', the second group includes the temperature data a" and b", which correspond to the frequency of 1000 Hz and the azimuth of 30°, the third group includes the pressure data c' and the fourth group includes the temperature data c", which correspond to the frequency of 1100 Hz and the azimuth of 40°. Here, the method of decomposing the oilfield data is only for the purpose of explanation, which does not set any limit to the technical scope of the invention, and those skilled in the art may decompose the oilfield data in any form based on the actual requirements.

Then, the image generator 202 generates an image (each image is regarded as one video frame) from each group of oilfield data in accordance with the contents and layout decided by the image layout template 212. The images represent views of all oilfield data acquired at a certain index of depth or time. That is, each video frame represents a view of the oilfield data at each index. In such a way, the image generator 202 can generate a plurality of images which represent views of characteristics, such as temperature and pressure, of all oilfield data acquired at a certain index of depth, or time. The generated images can correspond to at least one of the above modes, such as frequency and/or azimuth, and these generated images are separated from one another. In addition, for the purpose of illustration, the image can be a curve line or graphics simulated based on the group of the oilfield data by for example a method of least square, which visually indicates a view of certain physical characteristic of the oilfield data. Here, the method of forming an image based on the oilfield data is only for the purpose of explanation, which does not set any limit to the technical scope of the invention, and those skilled in the art may create the image based on the oilfield data in any other method according to the actual requirements.

The frame composer 204 receives the separated images from image generator 202, and composes the separated images corresponding to one of the above modes, such as frequency and/or azimuth, into continuous video frames as a video section in accordance with a predetermined rule. In such a manner, the frame composer 204 can generate a plurality of video sections, which correspond to different acquisition modes of the oilfield data. The acquisition modes include at least one of frequencies and azimuths.

The embodiment of the present invention adopts a video structure template 214 which will be described in detail hereafter, and the video structure template 214 can stipulate how to organize the video frames into the video section. That is, the frame composer 204 can compose the video frames into video sections in accordance with the video structure template 214. In the embodiment of the invention, in the frame composer 204, the video section, i.e. continuous frames, is generated from the received video frames as follows. As described above, the original oilfield data is linearly stored with indices of depth or time in the data source 210, and each frame represents a view of the oilfield data at each index. Therefore, the embodiment is designed in such a manner that a start index and a stop index are respectively mapped to a beginning frame and ending frame, which are respectively located in the beginning position and ending position of stream timeline of the video section. Then, an interval which decides the index changing step between two adjacent frames is set based on the actual requirement, and other indices between the start index and stop index can be automatically mapped onto those video frames between the beginning frame and ending frame. In such case, the video section is generated, which includes a set of continuous frames index by index.

For example, in the range of indices of depth 300-400, the frame composer 204 generates a section which includes 101 video frames F1-F101, in which an interval between two adjacent video frames is set to 1, the beginning video frame F1 corresponds to the start index of depth 300, and the ending video frame F101 corresponds to the stop index of depth 400. In the above example, a section which includes 51 video frames F1-F51 can also be generated, in which an interval between two adjacent video frames is set to 2, the beginning video frame F1 corresponds to the start index of depth 300, and the ending video frame F51 corresponds to the stop index of depth 400. In addition, another section which includes 11 video frames F1-F11 can be generated, in which an interval between two adjacent video frames is set to 1, the beginning video frame F1 corresponds to the start index of depth 320, and the ending video frame F11 corresponds to the stop index of depth 329. That is, the frame composer 206 can generate any video section including continuous frames index by index in the range of indices of 300-400 according to the requirements. Thus, a plurality of video sections can be formed corresponding to different acquisition modes, such as different frequencies, azimuths, etc.

In such a manner, the frame composer 204 can generate various video sections each of which includes a plurality of continuous video frames which correspond to each index of depth or time. Here, the method of forming the video section based on the video frames is only for the purpose of explanation, which does not set any limit to the technical scope of the invention, and those skilled in the art may create the video section based on the video frames in any other method according to the actual requirements.

The video composer 206 receives those different video sections from the frame composer 204, and organizes these video sections into a video delivery, such as a video file or a video stream. The video composer 206 composes the video sections into the video file or the video stream in accordance with the video structure template 214. In this embodiment, how to organize these sections into the video file or video stream is decided in accordance with the video structure template 214.

The delivery mixer 208 mixes the video files or video streams received from the video composer 206 and audio data received from an audio source 216, and generates a final video delivery. That is, the delivery mixer 208 adds audio data into the video delivery. The delivery mixer 208 also does some compression work to make the size of the final video delivery smaller than that of the output of the video composer 206. The audio source 216 in the invention is optional since the video delivery can be released without any audio output. The video delivery output from the delivery mixer 208 can include video files and/or video streams, which is stored in the video delivery base 218 of storage provided in the video server 104, or transmitted to the client device 108 via the network 106. Of course, the generated video delivery can also be written onto a physical media or uploaded to an online data center, and the use get the video delivery from the distributed media or by downloading from the online data center.

In the invention, as described before, the video server 104 can also comprise an encoder (not shown), which can also be integrated into any one of the image generator 202, frame composer 204, video composer 206, and delivery mixer 208 respectively. The encoder is used to perform a compression-coding method to encode the video frames into the video file and/or the video stream.

In compression-coding methods, a basic principle of data compression lies in removing data redundancy. Data redundancy includes: (i) spatial redundancy in which the same color or object is repeated in an image; (ii) temporal redundancy in which there is little change between adjacent frames in a moving image or the same sound is repeated in audio; or (iii) mental visual redundancy taking into account human eyesight and perception dull to high frequency. Data can be compressed by removing such data redundancy.

Compression-coding methods can be classified into loss/lossless compression according to whether source data is lost, intraframe/interframe compression according to whether individual frames are compressed independently, and symmetric/asymmetric compression according to whether time required for compression is the same as time required for recovery. In addition, data compression includes real-time compression when a compression/recovery time delay does not exceed 50 ms, and scalable compression when frames have different resolutions. For example, lossless compression is usually used for text, the loss compression is usually used for multimedia data, intraframe compression is usually used to remove spatial redundancy, and interframe compression is usually used to remove temporal redundancy. In addition, in order to support transmission media having various speeds or to transmit multimedia at a data rate suitable to a transmission environment, data coding methods having scalability are adopted, such as wavelet video coding and sub-band video coding. Scalability indicates the ability to partially decode a single compressed bit-stream, that is, the ability to perform a variety of types of video reproduction. Thereby, the above compression-coding technology can be used in the invention, and provide the user with video files or video streams in real time. However, the above video compression-coding methods are only for the purpose of explanation, which do not set any limit to the technical scope of the invention, and those skilled in the art may use any other methods according to the actual requirements.

In the invention, the data source 210, the image layout template 212, video structure template 214, and audio source 216, and video delivery base 218 can be stored in the ROM 10, and they can also be stored in a separate storage (not shown) of the video server 104. In addition, a plurality of the image layout templates 212 can be stored in the storage so as to be selected by the user. A plurality of the video structure templates 214 can be stored in the storage so as to be selected by the user. The user also can make a selection from a plurality of the audio sources stored in the storage according to his/her preference.

Figure 7:
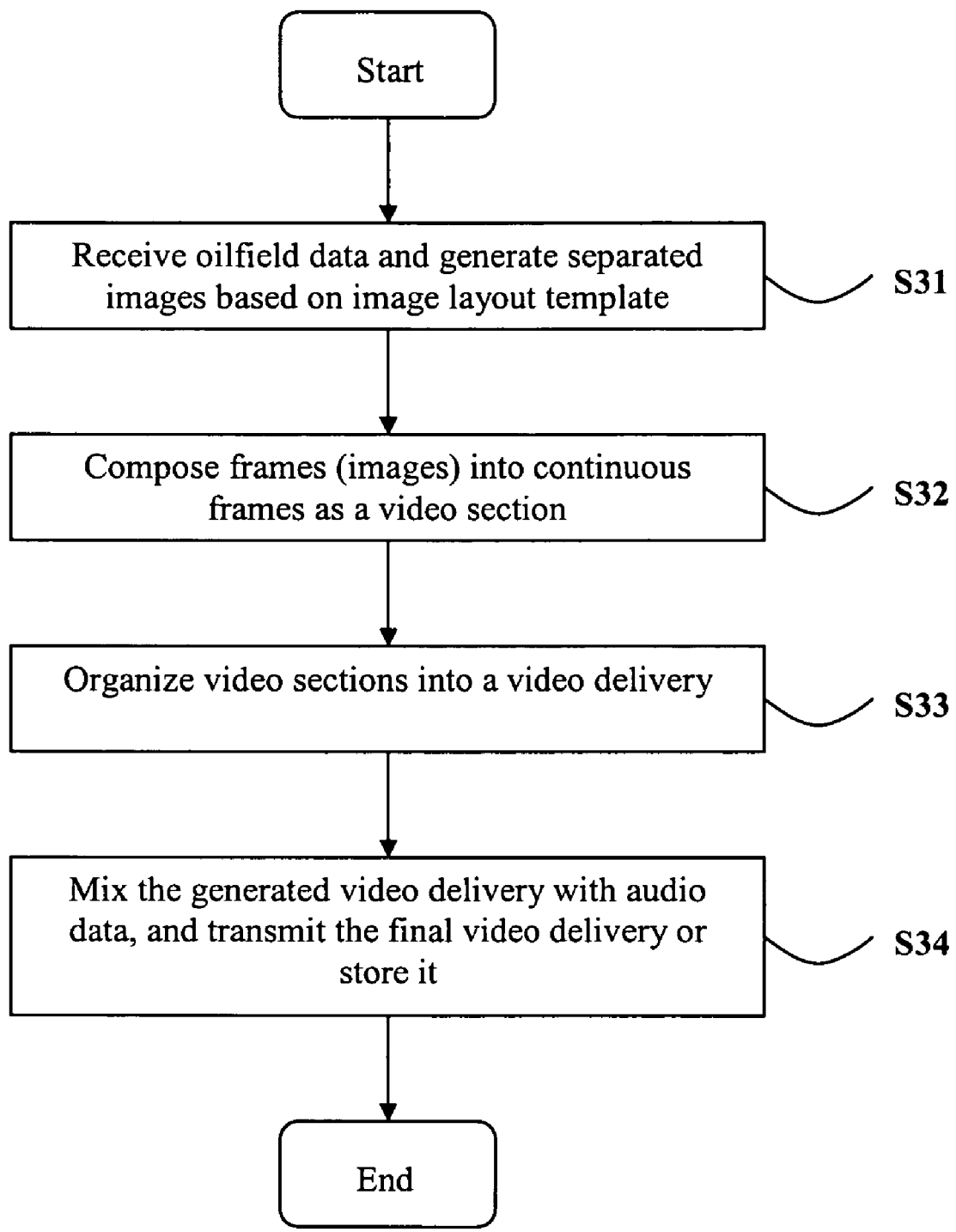
FIG. 7 illustrates a flow chart of the operation of the video delivery generation unit according to the embodiment of the invention.

FIG. 7 illustrates a flow chart of the operation of the video delivery generation unit according to the embodiment of the invention. As shown in FIG. 7, in step S31, the image generator 202 receives oilfield data from the data source 210 or the acquisition site 102, and generates separated images based on the internal organization of the oilfield data in accordance with the image layout template 212. In step S32, the frame composer 204 receives the separated images as video frames from image generator 202, and composes the video frames into continuous frames as a video section in accordance with a predetermined rule. In step S33, the video composer 206 receives several video sections from the frame composer 204, and organizes these video sections into a video delivery (video file or a video stream) in accordance with the video structure template 214. In step S34, the delivery mixer 208 mixes the video files or video streams received from the video composer 206 and audio data received from the audio source 216, and generates a final video delivery, then stores the final video delivery in the video delivery base 218 of the storage provided in the video server 104, or outputs it to the client device 108 via the network 106.

In one embodiment of the invention, the video server 104 receives the selection signal or control signal from the client device 108. The user can operate the video server 104 by the client device 108 to control the image generator 202, frame composer 204 and/or video composer 206, so as to customize any video delivery (video file or video stream) composed of continuous frames according to the user's requirements. In another embodiment of the invention, as described in the above, the video files or the video streams are sent to the client device 108. In case that the video files are sent to the client device 108, they can be directly played by a viewer unit (not shown) which includes a decoder (not shown) installed in the client device 108. In case that the video streams are sent to the client device 108, the user could analyze those oilfield data in a form of video in real-time by using the client device 108 which is integrated with a functional module performing the same function as the re-composer 112, or by selecting the video streams which are recomposed through the re-composer 112 provided outside of the client device 108.

Figure 8:
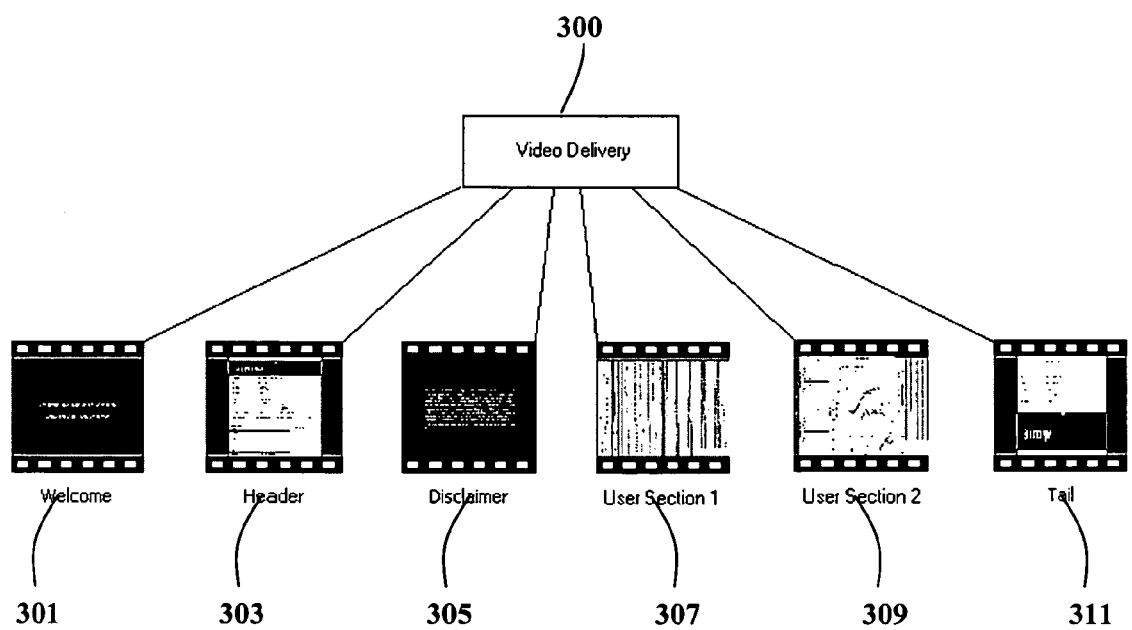
FIG. 8 illustrates the data structure (movie sequence) of the video delivery according to the embodiment of the invention.

Next, the structure of video delivery will be described in detail with reference to the drawings. FIG. 8 illustrates the structure (movie sequence) of the video delivery 300 output from the delivery mixer 208 and generated in the video composer 206, in which the video delivery 300 is defined by the video structure template 214. In this embodiment, the video structure template 214 is defined in such a manner that it decides how to organize the various video sections into a video file or a video stream (the video delivery). The video structure template 214 also can decide how to compose the various video frames into continuous frames so as to form a video section. Therefore, the video delivery 300 has the same data structure as that of the video structure template 214.

The basic element of the video delivery (movie) construction is a section, and each video delivery has several sections. In the invention, the video delivery may be composed of at least one first section, at least one second section, and at least one third section. The first section contains video data representing identification information, the second section contains video data representing the oilfield data, and the third section contains video data representing the end of the video delivery. Specifically, as shown in FIG. 8, the video delivery 300 comprises four mandatory sections, such as a Welcome 301, Header 303, Disclaimer 305 which can be regarded as the above first section and Tail 311 which can be regarded as the third section, as well as other service-specific sections (User section 307, User section 309, etc.), which can be regarded as the second section. For example, the Welcome 301 contains video data showing a title and logo of the video delivery 300, the Header 303 contains video data showing the basic information about the oilfield data source, the Disclaimer 305 contains video data giving a copyright announcement, and the contents of sections 301, 303 and 305 can be referred to as identification information in one embodiment. Tail 311 contains video data indicating the end of the video delivery 300. The User sections 307 and 309 contain video data representing oilfield data itself, i.e. they give the video clips which contain actual things the users are interested in. All the above sections and contents therein can be customized by modifying the video structure template 214. The sections of Welcome 301, Header 303, Disclaimer 305 and Tail 311 do not set any limit to the technical scope of the invention. In another embodiment of the invention, the video delivery 300 can contain none of the above mandatory sections, or contain only some of the above mandatory sections by modifying the video structure template 214, which can also represent other different information.

Figure 9:
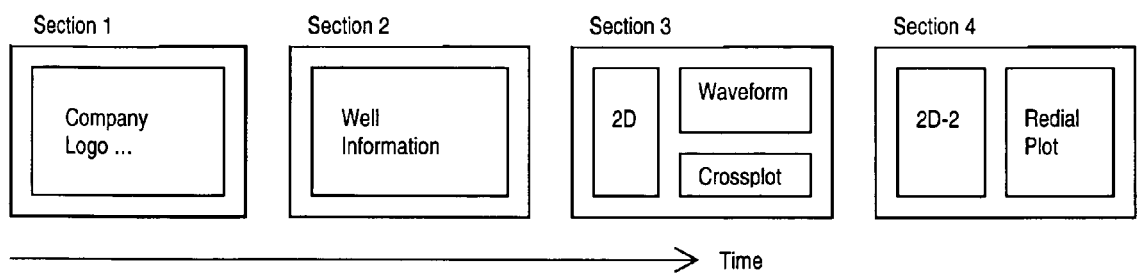
FIG. 9 illustrates another schematic diagram of structure (movie sequence) of the video delivery according to the embodiment of the invention.

FIG. 9 illustrates another schematic diagram of structure (movie sequence) of the video delivery according to the embodiment of the invention. As shown in FIG. 9, one section can further comprise several items. In each section, one or several items are displayed concurrently on different space of the screen. For example, Section 3 further comprises three Items, such as 2D, Waveform, and Crossplot, and Section 4 further comprises two Items, such as 2D-2 and Redial Plot. In different Items, different text contents or video clips or video in real-time can be shown.

In this embodiment, the user section 307 (or 309) is created from one or more continuous video frames which are generated from the oilfield data in the image generator 202 in accordance with the image layout template 212. The image layout template 212 stipulates the contents and layout of each of the video frames. The user section 307 (or 309) is created in the frame composer 204 in accordance with the video structure template 214. Each of the Items is also composed of one or more video frames in accordance with stipulations of the video structure template 214.

Hereinafter, an example will be given for explaining the structure of the video delivery. In the invention, a video file or video stream comprises a plurality of encoded sequential video frames, which for example include 100 video frames f1-f100. Here, the first frame f1 is specified as Section 1, which shows a company logo. Four video frames including the second frame f2 through the fifth frame f5 are specified as Section 2, in which the beginning frame is f2 mapped with start index of 2, and the ending frame is f5 mapped with stop index of 5, and Second 2 shows some information about the oilfield data, such as information about the well.

The subsequent twenty video frames including frame f6 through frame f25 are specified as Section 3, in which the beginning frame is f6 mapped with start index of 6, and the ending frame is f25 mapped with stop index of 25. We notice that Section 3 further includes three Items, and the three Items can be formed by the video frames f6-f25 as follows. The Item 1 is formed by f6-f16, Item 2 is formed by f17-f20, and Item 3 is formed by f21-f25, that is, Items 1-3 are formed respectively by video frames f6-f25 in sequence. Also, Items 1-3 can be formed by some of the video frames f6-f25 in any order instead of in sequence. In addition, each of the video frames f6-f25 can be divided into three parts based on a predetermined rule, and the first part of each of the video frames f6-f25 forms Item 1, the second part of each of the video frames f6-f25 forms Item 2, and the third part of each of the video frames f6-f25 form Item 3. Section 4 is formed from the video frames in the same manner as mentioned above, the detailed description will be omitted.

In such a manner, a video file or video stream includes several video sections, and are formed by a plurality of encoded sequential video frames. In case the client device 108 receives the video file or video stream, the viewer unit (not shown) thereon plays the video file or video stream in order of the video frames from the first frame f1 to subsequent video frames. In the meantime, if the user would like to play a certain section, such as Section 3, he/she specifies the Section 3 by a pointing device such as a mouse as input device, or input a signal corresponding to the start index of 6 of the Section 3 by a key board as input device, the video file or video stream will be played starting from the Section 3.

Next, there will be described the schema of the video structure template of the video delivery according to the embodiment of the invention. A video structure template needs to be defined before the movie generation strategy, and the video structure template is an XML file which defines the structure, layout and contents of the movie (video file or video stream).

Figure 10:
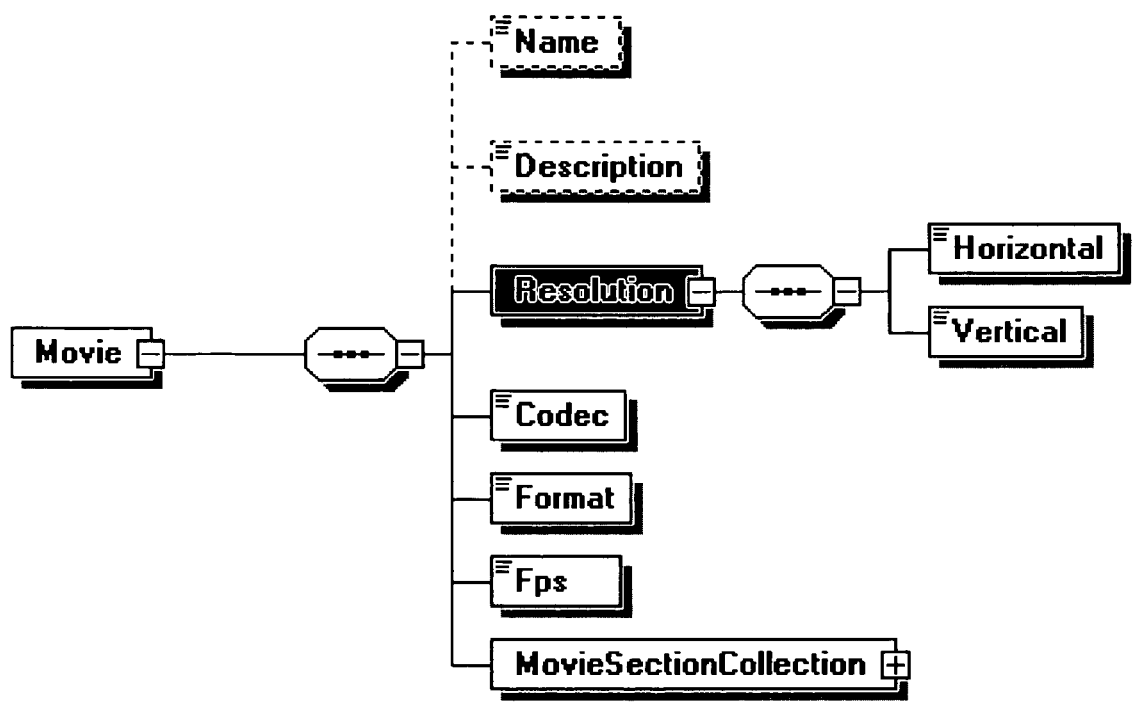
FIG. 10 shows a hierarchy tree of schema of the video structure template of the video delivery according to the embodiment of the invention.
Figure 11:
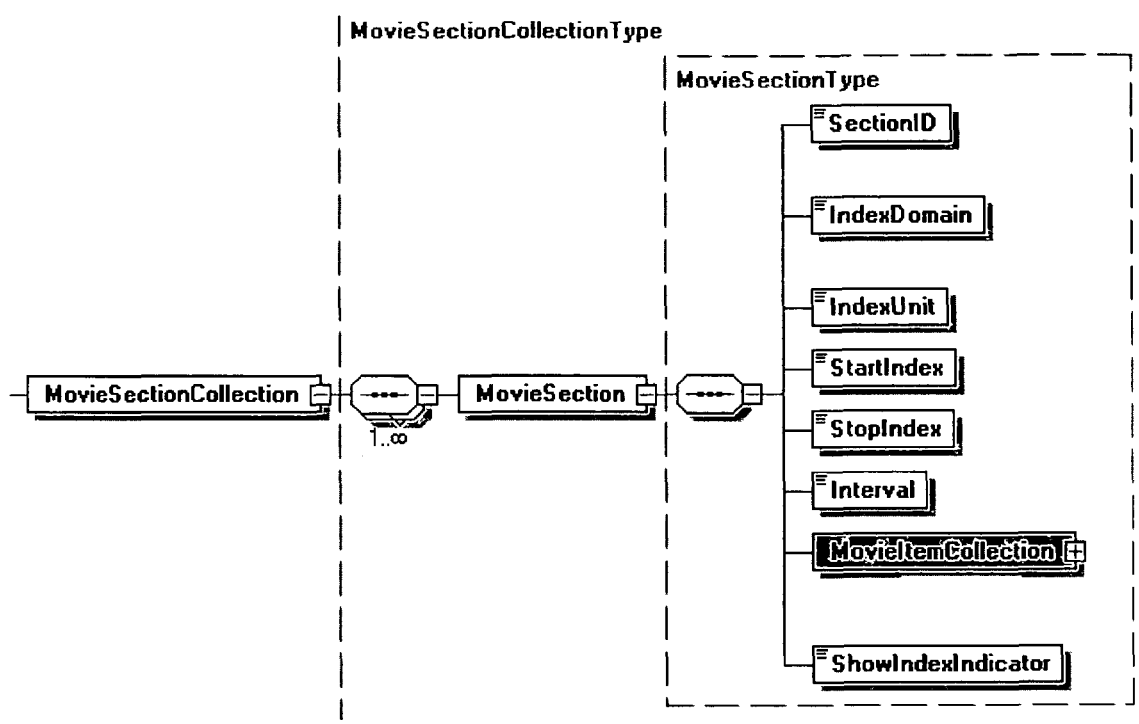
FIG. 11 shows another hierarchy tree of schema of the video section according to the embodiment of the invention.
Figure 12:
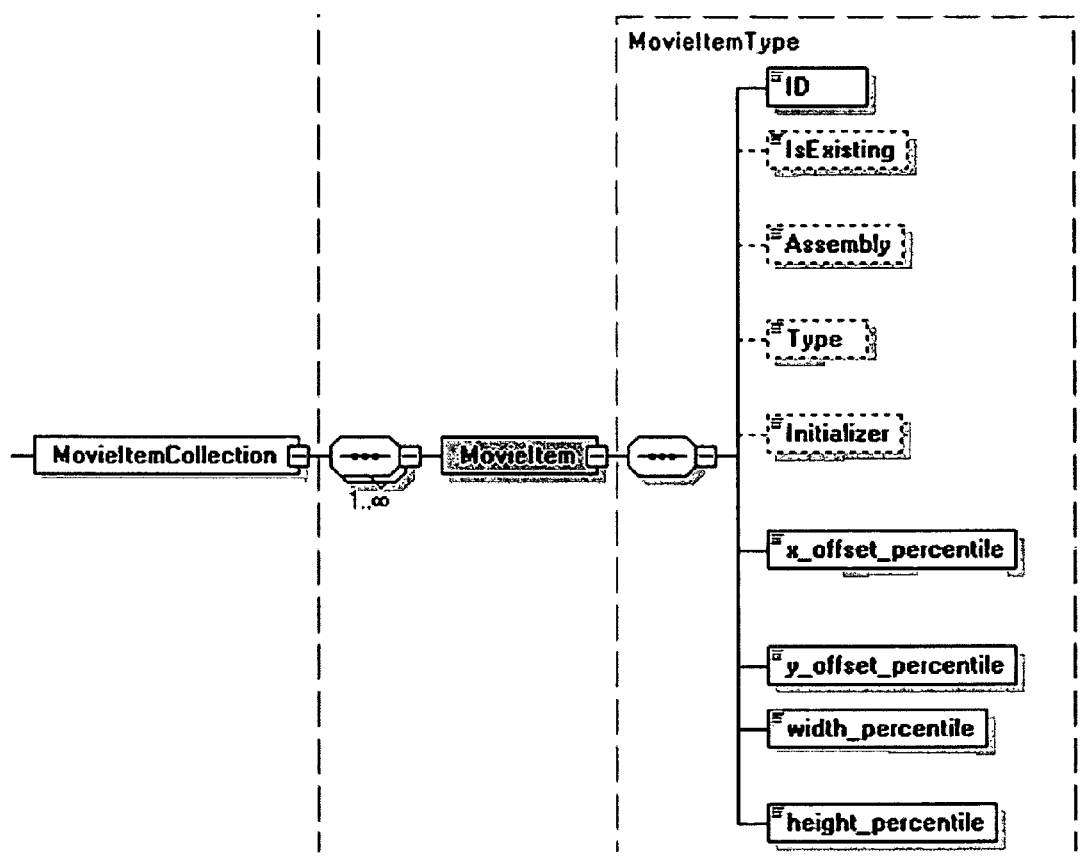
FIG. 12 shows another hierarchy tree of schema of the video item according to the embodiment of the invention.

FIGS. 10-12 schematically show a hierarchy tree of the schema of the video structure template of the video delivery. In the template schema as shown in FIG. 10, the video delivery may include a plurality of Movies (video), and each Movie is a root element of the template, and each movie (Movie) comprises at least one of the following parameters: a Name, Description, Resolution, Codec, Format, Fps, MoiveSectionCollection, etc. The Name describes the name of the Movie, and the Description is used for describing the schema or parameters of the video structure template. The Name and Description are optional.

The Resolution stipulates a horizontal resolution and vertical resolution of the image displayed on a screen unit. The Codec is used for stipulating the compression-coding methods of the video structure template. The Format stipulates a format which the displayed image data should comply with or a protocol which the transmitted data should comply with. The Fps stipulates number of video frames per second to be displayed on the screen unit. The MoiveSectionCollection indicates that the movie includes a plurality of movie sections.

As shown in FIG. 11, each movie section (MovieSection) is displayed on the screen unit during the stepping of the index range, and comprises at least one of the following parameters: a SectionID which is the identifier of the Section; an IndexDomain which indicates which domain the index belong to, wherein the index can be in depth domain, time domain or acquisition time domain (for real time); an IndexUnit which indicates the unit of the index, such as foot, second, etc.; a StartIndex, a value of which indicates a start index for identifying the beginning video frame of a video section; a StopIndex, a value of which indicates a stop index for identifying the ending video frame of a video section; an Interval which indicates a stepping length between indices of the two adjacent video frames; a MovieItemCollection indicates that the movie section includes a plurality of movie items, and each movie (video) item has its own space on the screen during the playing-back of the movie (video) section, that is, along with the index changes, the movie item will change its display; and a ShowIndexIndicator which stipulates an indicator showing the progress of stepping of the indices.

As shown in FIG. 12, a movie item (MovieItem) comprises at least one of the following parameters: an ID which is the identifier of the MovieItem; an IsExisting which indicates whether or not a movie item is existing in the template, if IsExisting is indicated as "True", the existing movie item will be used to form a movie section, otherwise, each movie item will be created as per the template; an Assembly which is used to create the UI; a Type which indicates the type of the UI; an Initializer which is a string and can be name, layout xml, etc.; a x_offset_percentile which indicates x offset on the screen to draw; a y_offset_percentile which indicates y offset on the screen to draw; a width_percentile which indicates width on the screen to draw; and a height_percentile which indicates height on the screen to draw. The above description is given on the schema of the video structure template of the video delivery. However, the above description about the schema of the video structure template is only for the purpose of explanation, which do not set any limit to the technical scope of the invention, and those skilled in the art may use any other schema which can implement the invention according to the actual requirements. The video structure template of the invention can be pre-defined and provided to meet the requirements of most cases. In addition, the video structure template of the invention also can be provided for the user to make limited modification.

In the present embodiment, the user can communicate with the video server 104, i.e. the user can control the operation of the video server 104 to create the video delivery (video file and/or video stream, or movie) by inputting the control codes and/or instruction codes through the input unit of the user interface 16, and by means of a GUI (Graphical User Interface), such as display, of the user interface 16. Next, the description will be given on the operation for the user to control the video server 104 via the user interface 16 with reference to FIG. 13.

Figure 13:
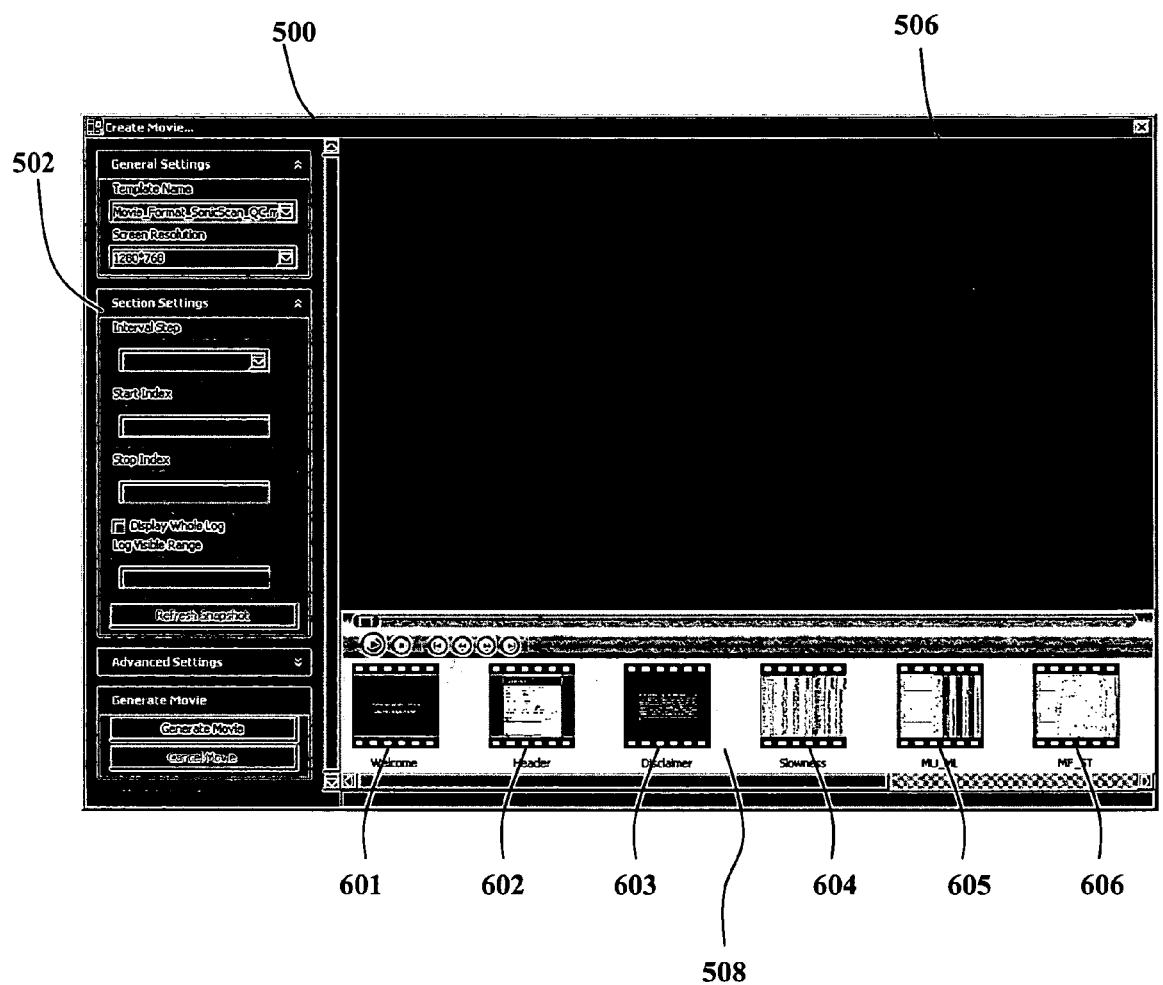
FIG. 13 illustrates a Graphical User Interface for controlling the video server to create the video delivery according to the embodiment of the invention.

FIG. 13 illustrates a GUI for creating video deliveries on the video server 104. As shown in the FIG. 13, a GUI 500 shown as a screen includes a setting area 502, a displaying area 506, and an editing area 508. In the setting area 502, there are provided General settings, such as fields of a template name and Screen resolution, through which the user can select either the image layout template 212 for the image generator 202 or the video structure template 214 for the frame composer 204 and video composer 206 and/or the delivery mixer 208, and further select one from the above each kind of plural templates, and set a solution for the screen. The image generator 202 retrieves a set of oilfield data which is stored linearly with time or distance indices from the data source 210, generates the separated images as video frames from the retrieved oilfield data based on the selected image layout template 212, and displays various video frames on the displaying area 506.

There are shown the video sections (continuous frames) in the editing area 508. The video sections are generated in the frame composer 204 based on the video frames (separated images) output from the image generator 202. In the setting area 502, there are also provided an interval step field, a start index field, and a stop index field. As described above, we assume the oilfield data is stored linearly with time or distance indices in the data source 210, and each frame represents a view of the oilfield data at each index. In this case, in order to create a video section, such as the video section 605, the user can input a start index in the start index field, and input a stop index in the stop index field. The start index and the stop index are respectively mapped to two video frames as the beginning frame and ending frame of the video section, which are respectively located in two different positions in a video stream timeline. In this manner, the video section such as the user-defined section 605 is created. Then, in the interval step field, the user inputs an interval step which decides the indices changing step between two adjacent frames.

For example, it is assumed that the start index corresponds to a position deep into the earth 300 feet, and the stop index corresponds to a position deep into the earth 400 feet. If the user set the interval step of the indices as 1 foot, the video server 104 generates various frames from the oilfield data acquired at the positions of 300, 301, 302, 303, 304, . . . , 400 feet on a basis of index by index respectively. In such case, there will be generated the user-defined section 605 including a total of 101 continuous frames, the first frame of which is marked with the start index of 300, and the last frame of which is marked with the stop index of 400. If the user set the interval step of the indices as 2 feet, the video server 104 generates various frames from the oilfield data acquired at the positions of 300, 302, 304, 306, . . . , 400 feet on a basis of index by index respectively. In this case, there will be generated the user-defined section 605 including a total of 51 continuous frames, the first frame of which is marked with the start index of 300, and the last frame of which is marked with the stop index of 400.

Thus, the video section including a set of continuous frames is generated. In a similar manner, a certain number of video sections are created which are shown in the editing area 508, and the detailed description is omitted.

In the setting area 502, there is also provided a Generate Movie button. When the Generate Movie button is clicked with a mouse, the video composer 206 automatically organizes these video sections into a video file or a video stream in accordance with the video structure template 214, and the user can check the generated video delivery on the displaying area 506. If the generated video delivery (video file or video stream) does not satisfy the requirements of the user, the user can click a Cancel Movie button to cancel the generated video file or video stream.

In the invention, there is provided a playback mode, i.e. in the bottom of the displaying area 506, there are provided some buttons of Play, Stop, Fast Search, Fast Back, Next Section, and Last Section for operating the displaying of the video delivery. It can be seen that in the playback mode, the generated video file or video stream can be controlled and played on the displaying area 506 of the screen, in which any specified section can be displayed in any order.

Thus, the method of the invention for creating a video delivery from oilfield data on the GUI comprising: displaying a first area (the displaying area 506), second area (the setting area 502), and third area (the editing area 508) on the GUI; retrieving a set of oilfield data, and displaying various frames derived from the set of oilfield data on the first area; and receiving input signals from the selection device, such as the mouse, operating on the second area, and, in response to the input signals, displaying each of generated video sections which form the video delivery on the third area. The second area includes entries of a template, interval, start index and stop index, and the input signals include the selection of the template, values indicative of the interval, start index, and stop index. The second area further includes entries of determination and cancellation, and the input signals include the determination and cancellation of the video delivery.

The above description has been given on the GUI and the method for creating the video delivery on the GUI of the video server 104. In the invention, the structure of the video server does not set any limit to the technical scope of the invention, and the implementation of the invention also can be realized by only software running in the CPU 10 of the video server 104, or by a combination of software running therein and a specific circuit of the video server 104.

While the present invention has been particularly shown and described with reference to exemplary embodiments thereof, it will be understood by those of ordinary skilled in the art that various changes in form and details may be made therein without departing from the spirit and scope of the present invention as defined by the following claims.

We claim:

1. A data delivering system comprising:
a video server receiving and without user intervention processing oilfield data into a video delivery, said video delivery including a plurality of sections of the oilfield data, wherein said video server includes a video delivery generation module that decomposes the oilfield data acquired at an index of depth or time into different groups based on different acquisition modes, generates images from the different groups of oilfield data, picks frames from the generated images and composes the frames into a plurality of continuous frames as a section for each acquisition mode to create said plurality of sections of the oilfield data, and organizes said plurality of sections of the oilfield data into the video delivery in accordance with a video structure template, and an interface that communicates the video delivery on the network;
a network delivering said video delivery from said video server to at least one client device; and
a recomposing computer coupled between the network and the at least one client device, said recomposing computer receiving the video delivery from the video server, rearranging sequence of the frames of the video delivery as original one, and sending the rearranged frames to the at least one client device, wherein said video server receives a selection signal from the at least one client device, and customizes contents of the plurality of sections of the oilfield data in response to the selection signal based on a section identifier; a domain selected from the group consisting of a depth domain, a time domain and an acquisition time domain; and an index comprising a dimension; a start value which indicates a start index for a beginning video frame of a video section; a stop value which indicates a stop index for identifying the ending video frame of a video section; and an interval which indicates a stepping length between indices of the two adjacent video frames.

2. The system of claim 1, wherein said video server receives a request signal from the at least one client device, and transmits requested ones of the plurality of sections of the oilfield data to the at least one client device in response to the request signal.

3. The system of claim 1, wherein any one of the plurality of sections is uniquely displayed on a screen by designation of a user.

4. The system of claim 1, wherein said plurality of sections of the oilfield data include at least one first section containing video data representing identification information, at least one second section containing video data representing the oilfield data, and at least one third section containing video data representing the end of the video delivery.

5. The system of claim 1, wherein the plurality of sections of the oilfield data correspond to different acquisition modes of the oilfield data, said acquisition modes including at least one of frequencies and azimuths.

6. The system of claim 1, wherein the at least one client device further includes a recomposing module that rearranges sequence of the frames as original one and displays the rearranged frames on the screen.

7. The system of claim 1, wherein said oilfield data is acquired from a data acquisition site.

8. A method for oilfield data delivery comprising:
receiving oilfield data and without user intervention processing the oilfield data into a video delivery;

decomposing the oilfield data acquired at an index of depth or time into different groups based on different acquisition modes;

generating images from the different groups of the oilfield data;

picking frames from the images and composing the frames into a plurality of continuous frames as a section for more than one acquisition mode to create plurality of sections of the oilfield data;

organizing said plurality of sections of the oilfield data into the video delivery in accordance with a video structure template;

delivering said video delivery to a recomposing computer;

receiving video delivery and rearranging sequence of the frames of the video delivery as original one, and sending the rearranged frames to the at least one client device via a network; and receiving a selection signal from the at least one client device that customizes contents of the plurality of sections of the oilfield data in response to the selection signal based on a section identifier; a domain selected from the group consisting of a depth domain, a time domain and an acquisition time domain; and an index comprising a dimension; a start value which indicates a start index for a beginning video frame of a video section; a stop value which indicates a stop index for identifying the ending video frame of a video section; and an interval which indicates a stepping length between indices of the two adjacent video frames.

9. The method of claim 8 further comprising receiving a request signal from the at least one client device, and transmitting requested ones of the plurality of sections of the oilfield data to the at least one client device in response to the request signal.

10. The method of claim 8, wherein said plurality of sections of the oilfield data include at least one first section containing video data representing identification information, at least one second section containing video data representing the oilfield data, and at least one third section containing video data representing the end of the video delivery.

11. The method of claim 8, wherein the plurality of sections of the oilfield data correspond to different acquisition modes of the oilfield data, said acquisition modes including at least one of frequencies and azimuths.

12. The method of claim 8, wherein said oilfield data is acquired from a data acquisition site.

13. A video delivery generation apparatus for generating a video delivery from oilfield data without user intervention, comprising:

an image generator that decomposes the oilfield data into different groups acquired at an index of depth or time based on different acquisition modes, generates a plurality of images from the different groups of oilfield data, and picking frames from the generated images;

a frame composer that receives the frames from the image generator and composes the frames into continuous frames as a video section for an acquisition mode of the oilfield data, wherein the video section of the oilfield data has a predetermined length corresponding to a distance or time elapse of the oilfield acquisition, and the amount of the frames included in the video section of the oilfield data is determined by a predetermined interval of depth of time and the length of the video section of the oilfield data;

a video composer that receives a plurality of video sections of the oilfield data from the frame composer and organizes the video sections of the oilfield data into the video delivery in accordance with a video structure template; and an input module that receives a selection signal from a user that customizes contents of the plurality of sections of the oilfield data in response to the selection signal based on a section identifier; a domain selected from the group consisting of a depth domain, a time domain and an acquisition time domain; and an index comprising a dimension; a start value which indicates a start index for a beginning video frame of a video section; a stop value which indicates a stop index for identifying the ending video frame of a video section; and an interval which indicates a stepping length between indices of the two adjacent video frames.

14. The apparatus of claim 13 further comprising an interface that delivers said video delivery to outside of the apparatus.

15. The apparatus of claim 13 further comprising a delivery mixer that adds audio data into said video delivery.

16. The apparatus of claim 13, wherein the plurality of sections of the oilfield data include at least one first section containing video data representing identification information, at least one second section containing video data representing the oilfield data, and at least one third section containing video data representing the end of the video delivery.

17. The apparatus of claim 13, wherein the plurality of sections of the oilfield data correspond to different acquisition modes of the oilfield data, said acquisition modes including at least one of frequencies and azimuths.

18. The apparatus of claim 13, wherein said oilfield data is acquired from a data acquisition site.

19. A computer-implemented method of generating a video delivery from oilfield data without user intervention, comprising:

a first step of decomposing the oilfield data acquired at an index of depth or time into different groups based on different acquisition modes;

a second step of generating various frames from the different groups of the oilfield data;

a third step of creating a video section of the oilfield data by selecting a beginning frame and an ending frame with desired acquisition depth or time for an acquisition mode, collecting frames within the range of the desired acquisition depth or time with a predetermined interval between every two adjacent frames, so as to compose the various frames into continuous frames as a video section of the oilfield data;

repeating the third step to generate a plurality of sections of the oilfield data;

organizing said plurality of video sections of the oilfield data into the video delivery in accordance with a video structure template; and customizing contents of the plurality of video sections of the oilfield data in response to a selection signal based on a section identifier; a domain selected from the group consisting of a depth domain, a time domain and an acquisition time domain; and an index comprising a dimension; a start value which indicates a start index for a beginning video frame of a video section; a stop value which indicates a stop index for identifying the ending video frame of a video section; and an interval which indicates a stepping length between indices of the two adjacent video frames.

* * * * *